United States Patent [19]

Hoelzinger

[11] 4,128,677

[45] Dec. 5, 1978

[54] MULTI-FLUTE-LAYER CORRUGATED BOARD

[75] Inventor: Walther J. Hoelzinger, Vienna, Austria

[73] Assignee: Boise Cascade Corporation, Boise, Id.

[21] Appl. No.: 889,387

[22] Filed: Mar. 23, 1978

Related U.S. Application Data

[62] Division of Ser. No. 722,699, Sep. 13, 1976.

[51] Int. Cl.² ............... B31F 1/22; B32B 3/28
[52] U.S. Cl. .................. 428/57; 156/182; 156/207; 156/210; 156/266; 428/182; 428/184; 428/185; 428/186; 428/189
[58] Field of Search ............ 428/33, 44, 47, 48, 428/53, 58, 182, 184, 185, 186, 57, 189, 191; 156/182, 207, 210, 201, 205, 264, 266

[56] References Cited

U.S. PATENT DOCUMENTS

| 1,504,218 | 8/1924 | Crowell | 156/207 |
|---|---|---|---|
| 1,935,214 | 11/1933 | Schroeder | 156/207 |
| 2,008,974 | 7/1935 | Weber | 156/207 |
| 2,054,867 | 9/1936 | Rudin et al. | 428/185 |
| 3,773,587 | 11/1973 | Flewwelling | 156/201 |

FOREIGN PATENT DOCUMENTS

| 221348 | 5/1962 | Austria | 428/185 |
|---|---|---|---|
| 453225 | 11/1949 | Italy | 156/210 |
| 272842 | 1/1951 | Switzerland | 156/210 |

Primary Examiner—Michael G. Wityshyn
Attorney, Agent, or Firm—Lawrence E. Laubscher

[57] ABSTRACT

A method and apparatus are disclosed for forming a novel corrugated paperboard web of indefinite length, which web includes a planar facer layer and a corrugated layer the flutes of which extend longitudinally the length of the web. The web is formed by splicing together sections having offset planar facer and corrugated layers of generally equal dimensions, respectively, whereby at one end the facer layer projects beyond the corrugated layer and at the other end the corrugated layer projects beyond the facer layer, the flutes of the corrugated layer extending from one projecting end to the other. Successive sections are spliced together with the projecting facer layer portion of one section overlying the projecting corrugated portion and the facing layer of another section, preferably with the adjacent portions of the corrugated layers of the two sections being in flute-enmeshing engagement. A conventional second web having a planar facer layer and a corrugated layer with transverse flutes may then be bonded in superimposed relation to the first web, thereby defining a third web having successive corrugated layers the flutes of which extend longitudinally and transversely of the third web, respectively.

4 Claims, 14 Drawing Figures

U.S. Patent   Dec. 5, 1978   Sheet 1 of 5   4,128,677
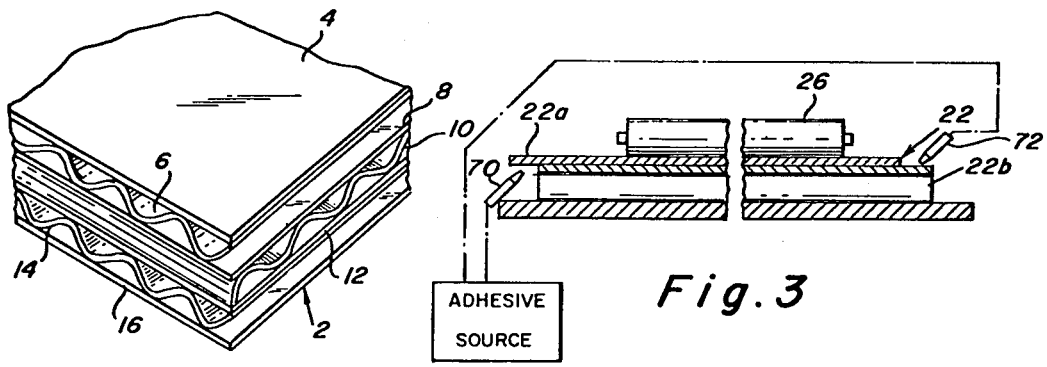
PRIOR ART
Fig. 1
Fig. 3
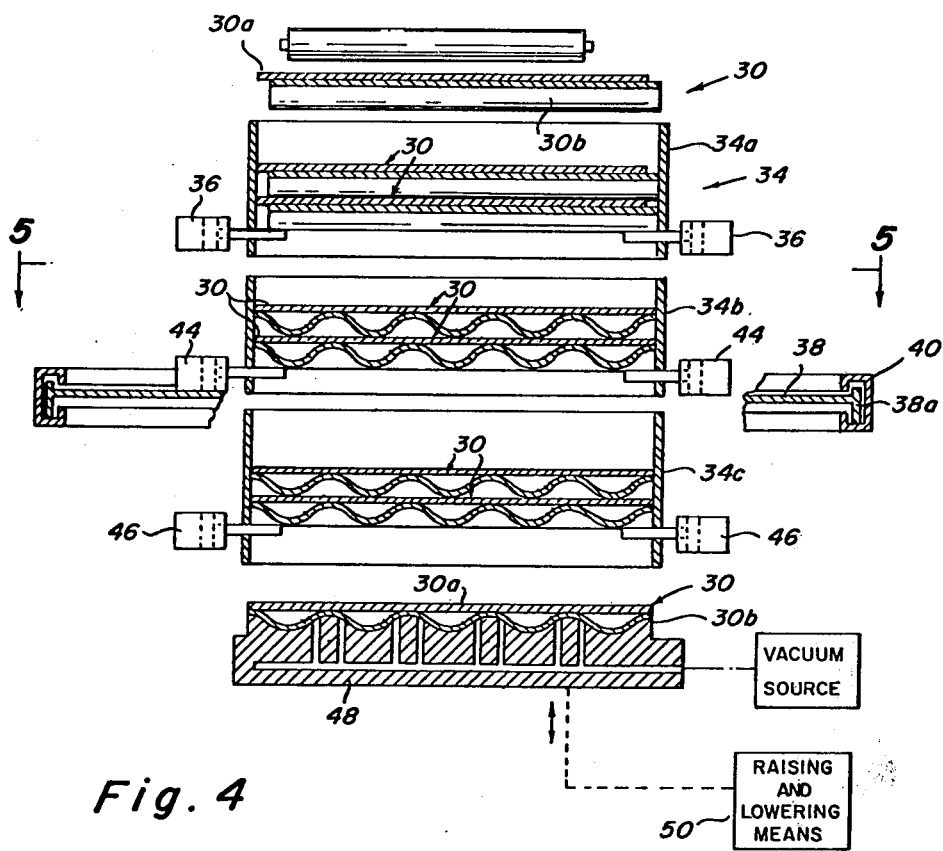
Fig. 4

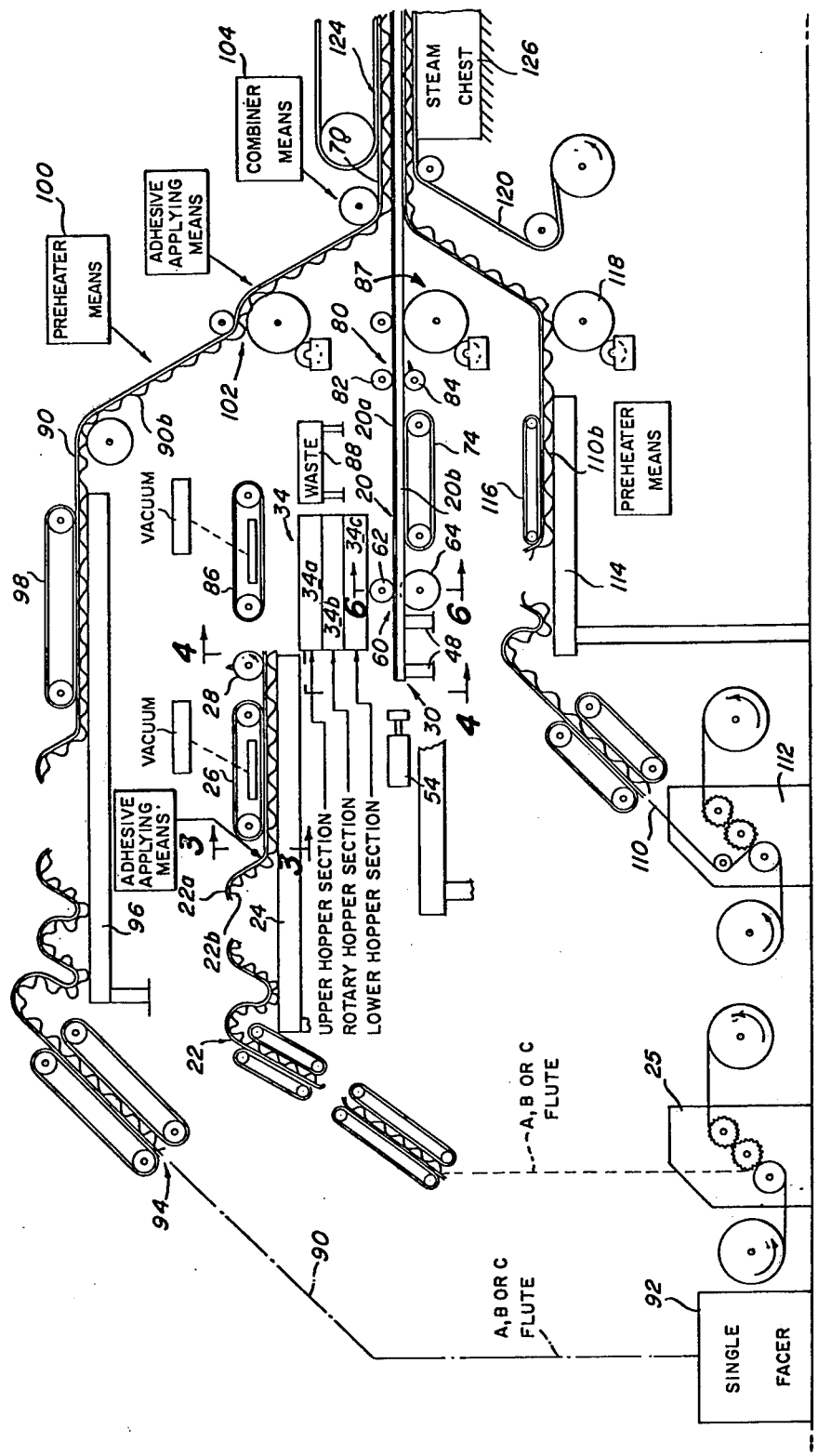

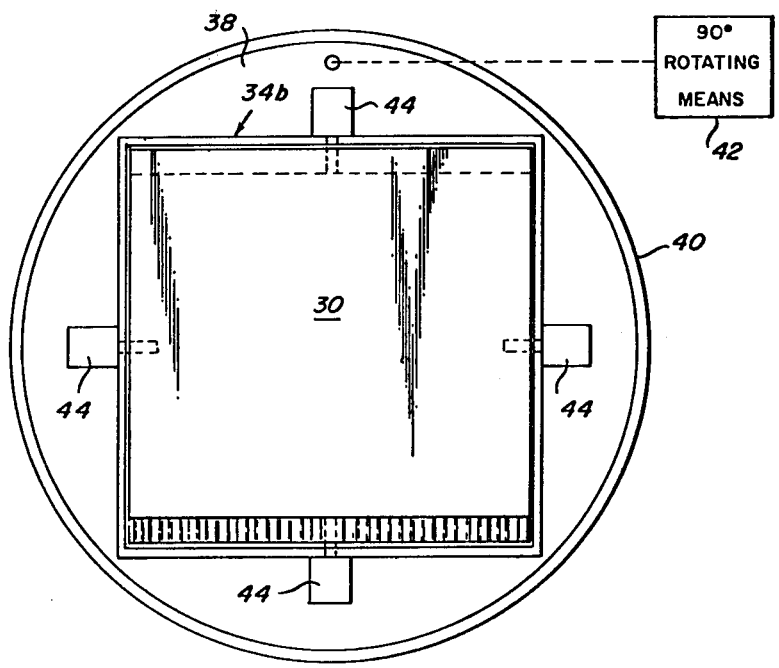
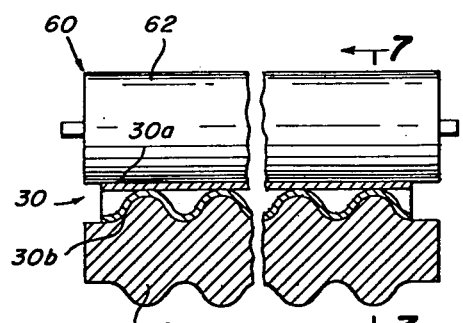
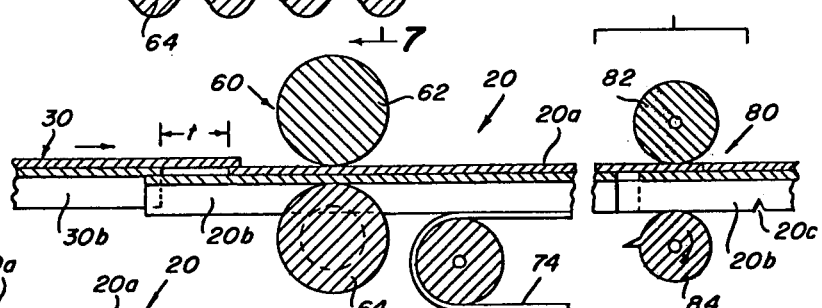
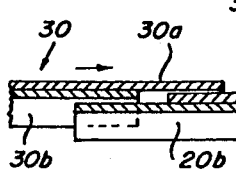
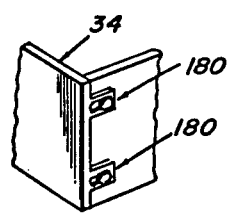
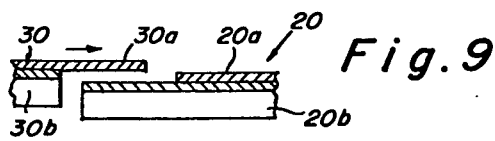

MULTI-FLUTE-LAYER CORRUGATED BOARD

This is a division, of application Ser. No. 722,699, filed Sept. 13, 1976.

BRIEF DESCRIPTION OF THE PRIOR ART

It is well known in the prior art—as evidenced, for example, by the U.S. patents to Rudin et al No. 2,054,867, Finck No. 2,091,918 and Hollenbach No. 3,112,184, for example—to provide a paperboard laminate including superimposed corrugated layers, the flutes of one layer extending orthogonally relative to the flutes of another layer, thereby to produce a greatly strengthened corrugated board.

Various types of machines and methods have been proposed for producing such multi-corrugated-layer board. In the Austrian patent No. 221,348, one single facer web is severed into successive sections that are rotated through 90° (by means of adjacent belts traveling at different velocities) and are then successively independently bonded to a second web to form a third web the flutes of one corrugated layer of which extend longitudinally of the third web, and the flutes of another corrugated layer of which extend transversely thereof.

SUMMARY OF THE INVENTION

The present invention was developed to provide a novel single facer web of indefinite length having a planar facer layer and a corrugated layer the flutes of which extend longitudinally the length of the web, and to a method and apparatus for forming the web. The web is then bonded to one or more conventional single facer webs having transverse flutes, thereby to define a second web having successive corrugated layers the flutes of which are orthogonally arranged, respectively.

Accordingly, a primary object of the invention is to provide a novel single facer web of indefinite length having a planar facer layer, and a corrugated layer the flutes of which extend longitudinally thereof, According to another object, a method and apparatus are provided for forming the web by splicing together a succession of sections each having laterally-offset facer and corrugated layers, whereby at one end, the facer layer projects beyond the corrugated layer, and at the other end, the corrugated layer projects beyond the facer layer, the flutes extending from one projecting end to the other. The projecting facer layer of one section is bonded to the adjacent portion of the next section, the adjacent portions of the corrugated layers of the sections preferably being in flute-enmeshing engagement, thereby to provide alignment and to impart strength and longitudinal rigidity to the first web.

Owing to the splicing together of the severed sections to form the first web, this web may be more readily handled for combining within a normal corrugator apparatus with one or more other webs, thereby affording greater manufacturing versatility, conservation of space, and a greatly stronger resulting multi-corrugated-layer board that is suitable for severing into desired various lengths. If desired, the exposed tips of the flutes of the corrugated layer of the first web may be transversely scored to provide a limited degree of longitudinal flexibility to the first web.

According to another object of the invention, the single facer corrugated sections are supplied to the splicing means in succession from the bottom of hopper means in which the horizontal sections are stored in a vertical stack. The sections may be supplied to the upper end of the hopper means either manually, or by severing the sections from a second web having laterally offset facer and corrugated layers, the flutes of the corrugated layer extending transversely of the second web. In the event that the second web is supplied with its longitudinal axis contained in the vertical plane containing the longitudinal axis of the first web, the hopper means includes means for rotating the severed sections through an angle of 90°, whereby the sections may be supplied from the hopper means successively to the splicer means with the flutes of the sections extending parallel to the axis of the first web.

According to a further object of the invention, the first web may be bonded in superimposed relation to one or more conventional third single facer webs having transverse flutes, whereby the flutes of various corrugated layers extend at right angles to each other, thereby to strengthen and impart rigidity to the third web both longitudinally and transversely. The third web may be subsequently transversely severed into blanks of desired lengths for forming corrugated containers and the like.

In accordance with a more specific object of the invention, the horizontal second web from which the sections are severed and the horizontal third web are longitudinally supplied in superimosed relation with their longitudinal axes contained in a vertical plane containing the longitudinal axis of the first web, thereby resulting in a saving of floor space in the manufacturing facility. The second and third webs are supplied continuously, hopper means being provided for storing the sections severed from the second web and for rotating the sections about their central vertical axes through 90° to positions in which the flutes extend parallel with the longitudinal axis of the first web. In one embodiment, the storage hopper means are contained in the path of the second web, and in another embodiment the storage hopper means are laterally arranged relative to the axes of the first and second webs, transfer means being provided for displacing the severed sections laterally to the top of the storage hopper means, and for returning severed sections from the bottom of the hopper means to a position longitudinally arranged relative to the first web for transfer to the splicing means.

BRIEF DESCRIPTION OF THE FIGURES

Other objects and advantages of the invention will become apparent from a study of the following specification when viewed in the light of the accompanying drawing, in which:

FIG. 1 is a detailed perspective view of a multi-flute-layer corrugated board produced in accordance with the present invention;

FIG. 2 is a schematic elevational illustration of the apparatus of the present invention for forming the product of FIG. 1 as incorporated into a conventional corrugation;

FIGS. 3 and 4 are sectional views taken along lines 3—3 and 4—4 of FIG. 2;

FIG. 5 is a sectional view taken along line 5—5 of FIG. 4;

FIG. 6 is a sectional view taken along line 6—6 of FIG. 2;

FIG. 7 is a sectional view taken along line 7—7 of FIG. 6;

FIGS. 8 and 9 are detailed views illustrating the various manners of splicing together the severed sections to form the first web;

FIG. 14 is a perspective view illustrating the means for adjusting the size of the hopper means to correspond with the size of the severed sections.

DETAILED DESCRIPTION

Figure 10:
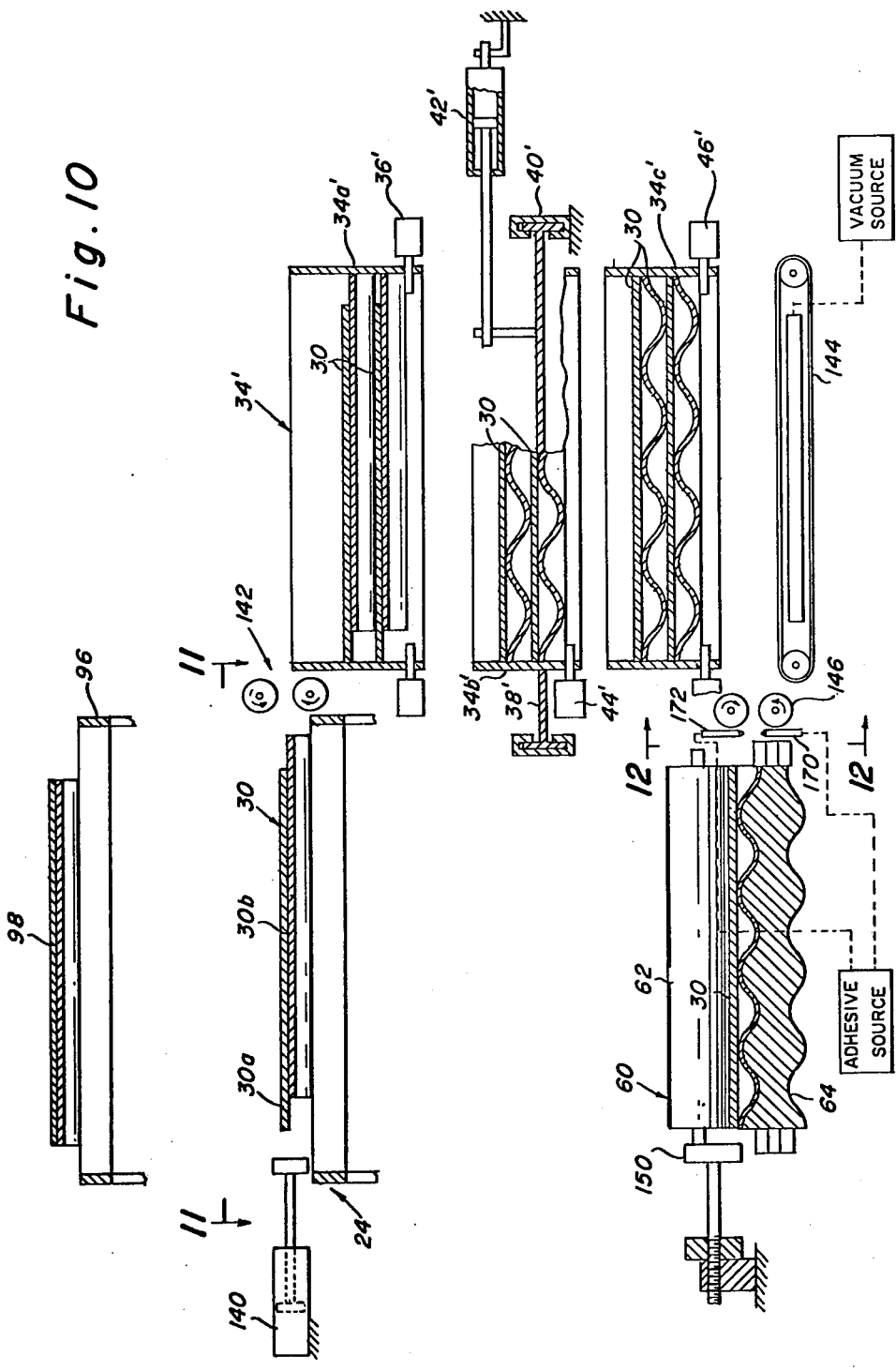
FIG. 10 is a view corresponding to FIG. 4 of a second embodiment of the invention wherein the storage hopper means are laterally arranged relative to the axes of the first and second webs.

Referring first more particularly to FIG. 1, the conventional multi-corrugated-layer board 2 includes a first planar backing layer 4, a first corrugated layer 6, a second backing layer 8, a second corrugated layer 10, a third backing layer 12, a third corrugated layer 14, and a fourth backing layer 16. The flutes of the central corrugated layer 10 are orthogonally arranged relative to the flutes of the corrugated layers 6 and 14.

Referring now to FIG. 2, the apparatus of the present invention is operable to form a first web 20 having a planar upper facer layer 20a, and a lower corrugated layer 20b, the flutes of which extend longitudinally of the web. The first web 20 consists of a plurality of spliced sections that are severed from a second web 22 that is supplied to an intermediate bridge 24 by single facer corrugating apparatus 25. As illustrated in FIG. 3, the second web 22 includes a planar upper layer 22a that is laterally displaced from a lower corrugated layer 22b the flutes of which extend transversely of the section web 22. Consequently, at one longitudinal edge of the second web 22, the planar facer layer 22a projects laterally beyond the corrugated layer 22b, and at the other longitudinal edge, the corrugated layer 22b projects laterally beyond the planar layer 22a. The second web 22 is conveyed longitudinally of the intermediate bridge 24 by endless conveyor means 26 of the vacuum conveyor type toward rotary cut-off means 28 that transversely severs the second web into a plurality of sections 30 (FIG. 4) of equal length. In each of these severed sections 30, of course, the planar upper facer layer 30a will project at one end beyond the corrugated layer 30b, and at the other end the corrugated layer 30b will project beyond the planar layer 30a, the flutes of the corrugated layer extending from one projecting end of the section to the other. The successively severed sections are deposited in the stationary upper section 34a of hopper means 34. The severed sections 30 are retained in the form of a vertical stack within the upper hopper section 34a by retractable retaining means 36 that are operable to deposit the stack of severed sections into an intermediate rotatable hopper section 34b. The intermediate hopper section 34b is supported by a circular plate 38 having at its outer edge portion a circular flange 38a that is supported for rotation within a stationary circular guide 40. The circular plate 38 and the stationary circular guide means 40 support the intermediate hopper 34b for rotation about its central vertical axis through an angle of 90° by conventional rotating means 42 (which may be, for example, pinion means driven by an electric motor, piston and cylinder hydraulic motor means, or the like). Thus, the intermediate hopper portion 34b may be rotated through 90° to a position in which the flutes of the sections 30 contained therein extend parallel to the longitudinal axes of the first web 20 and the second web 22. The severed sections are retained in the intermediate hopper portion 34b by retractable retaining means 44. Consequently, the retaining means 44 may be operable to release the stack of sections 30 stored in the intermediate hopper section 34b, which sections are then deposited in the stationary lower hopper section 34c. The stack of sections 30 stored in the lower hopper section are retained by retractable retainer means 46. The retractable retainer means 36, 44 and 46 may be of any conventional type, such as the piston and cylinder motor type. Successive severed sections are removed from the bottom of the stack in the lower hopper section 34c by coordinated movement of the retractable retaining means 46 and vertically displaceable vacuum support bars 48 that are vertically displaced by raising and lowering means 50. As shown in FIG. 4, the profile of the upper surface of each vacuum support bar 48 corresponds with the lower surface of the corrugated layer 30b of the severed section 30. When the severed section 30 has been lowered to a position coplanar with the first web 20, stationary kicker means 54 are operated to longitudinally displace the severed section 30 toward the splicing means 60.

Referring now to FIGS. 6 and 7, successive severed sections 30 are conveyed in the coplanar direction parallel with their flutes toward a pair of vertically spaced pressing rollers 62 and 64. The upper pressing roller 62 is cylindrical throughout its length for pressing engagement with the planar upper surface 30a of the severed section, and the lower pressing roller has a cross-sectional profile configuration which corresponds with the corrugated lower surface of the corrugated layer 30b of the severed section 30. As shown in FIG. 7, the severed section 30 is so linearly displaced by the pusher means 54 that the leading portion of the section 30 having the projecting planar facer layer 30a overlies the rearwardly projecting corrugated layer 20b of the first web 20. Referring back again to FIG. 3, it will be seen that stationary nozzles 70 and 72 are provided adjacent the longitudinal edge portions of the second web 22 for applying an adhesive material to the lower surface of the projecting portion of the upper planar layer 22a, and to the upper surface of the projecting portion of the lower corrugated layer 22b, respectively. Consequently, when the second web 22 is severed into sections 30 and these sections are rotated through 90° by the rotary hopper means, for each severed section adhesive material will have been applied to the underlying surface of the leading projecting planar portion 30a and to the upper surface of the trailing projecting corrugated portion 30b. Alternatively, the stationary nozzles 70 and 72 may be arranged downstream from the rotary cutoff means 28 for applying the adhesive material to the underlying surface of the projecting planar portion 30a and the upper surface of the projecting corrugated layer 30b at each end of each severed section 30. Consequently, when the severed section 30 is introduced into the splicing means 60 as shown in FIG. 7, the under surface of the projecting portion of the planar facer layer 30a and the upper tips of the flutes of the projecting portion of the corrugated layer 20b of the first web 20 are coated with an adhesive layer so that when the joint between the first web and the severed section passes between the pressing rollers 62 and 64, the coextensive surfaces of the projecting planar and corrugated layers will be bonded together. Preferably, the speed of the section 30 relative to the speed at which the first web is conveyed by conveyor means 74 it is such that at least a portion of the corrugated layer 30b of the section 30 is in flute-enmeshing engagement with the projecting portion of the corrugated layer 20b of first web 20, as shown in FIG. 7. Owing to the flute-enmeshing engagement between the corrugaged layers 30b and 20b, the resulting first web 20 is greatly strengthened and has a relatively low degree of longitudinal flexibility. In accordance with an important feature of the invention, the splicing of the severed sections to the web 20 has a relatively low tolerance dimension. As shown in FIG. 8, section 30 might be longitudinally displaced forwardly to a greater extent than shown in FIG. 7, whereupon the length of the portion of the corrugated section 30b that is in flute-enmeshing engagement with the projecting trailing portion 20b of the first web 20 is greatly increased. On the other hand, it is, of course, possible to effect a splice in which the flutes of the section 30b are not in engagement with the flutes of the projecting trailing portion 20b of the first web 20 as shown in FIG. 9. The embodiment of FIG. 9, of course, would not have the longitudinal strength and rigidity characteristics provided by the embodiments of FIGS. 7 and 8.

If desired, the longitudinal rigidity of the first section 20 might be reduced by transversely scoring the lower tip portions of the flutes of the lower corrugated layer 20b of the first web 20. To this end, the first web 20 is passed through scoring means 80 including a scoring roller 84 arranged opposite a back-up roller 82. Thus, the score means 80 is operable to provide longitudinally spaced scores 20c in the lower tip portions of the flutes of the corrugated layer 20b. The first web 20 then passes through an adhesive applying station 87 that applies adhesive to the lower tip portions of the flutes of the corrugated layer 20b of the first web 20.

In the event that the single facer 25 is supplying the second web improperly (producing waste), the endless conveyor means 86 is operated to cause the defective material to be deposited in the waste receptacle 88.

A conventional single facer third web 90 having a planar upper layer and a corrugated lower layer the lateral edges of which are aligned is provided by the single facer corrugator apparatus 92 and is deposited by conveyor means 94 upon the upper bridge 96. The third web is conveyed by endless conveyor means 98 through pre-heater means 100 and through the adhesive applying station 102 in which conventional adhesive material is applied to the lower surface of the lower corrugated layer 90b of the third web 90. The first web 20 and the third web 90 then pass through combiner means 104 which is operable to combine the first and third webs together to define a fourth web the corrugated layers of which have flutes extending at 90° relative to each other, respectively. Similarly, a fifth web 110 having a planar upper surface and a corrugated lower surface the lateral edges of which are aligned is provided by a conventional corrugator apparatus 112 which supplies the fifth web to a lower bridge 114. The fifth web is collected on the lower bridge and is conveyed by conveyor means 116 through the adhesive applying station 118 which again applies adhesive to the lower surface of the corrugated layer 110b of the fifth web 110. The fifth web then is introduced in the combiner means 104 whereupon it is secured to the lower surface of the fourth web. A planar facer layer 120 is also supplied to the combiner means 104 and is secured to the lower surface of the corrugated layer 110b to define a sixth web 124 the alternate corrugated layers of which have flutes which extend normal to each other, respectively. The sixth web then passes through a steam chest 126 which permanently sets the adhesive to bond the various layers and webs together.

Figure 11:
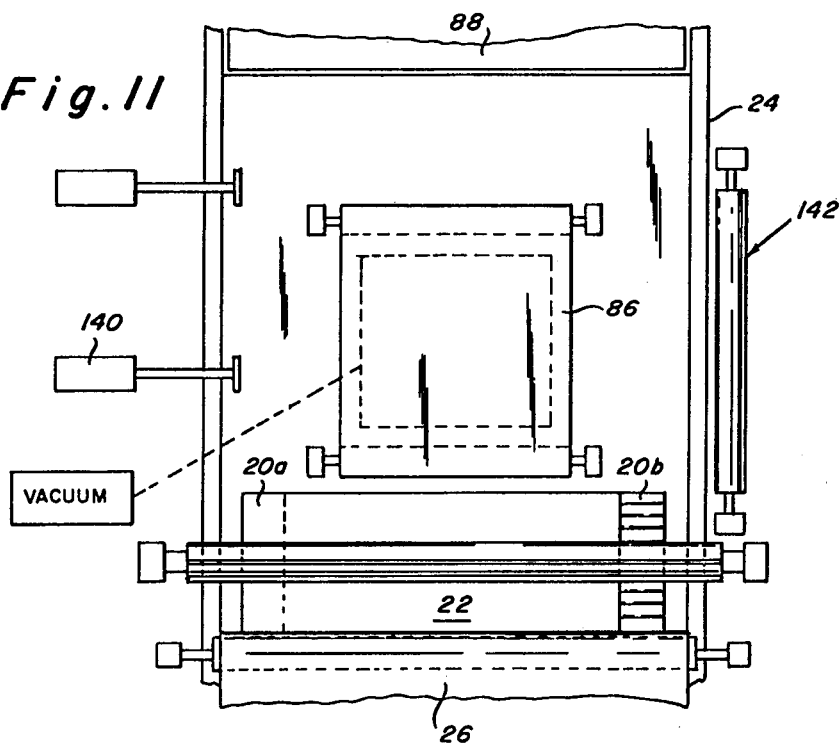
FIG. 11 is a top plan view taken along line 11—11 of FIG. 10.
Figure 12:
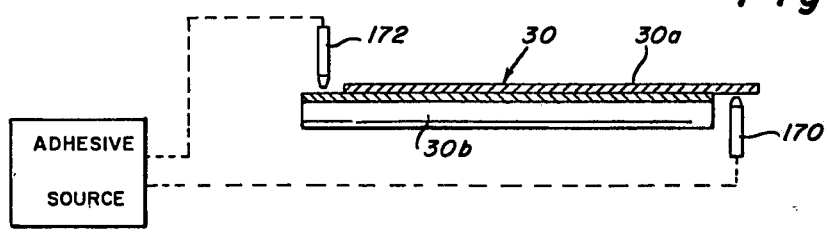
FIG. 12 is a sectional view taken along line 12—12 of FIG. 10.

In the embodiment of FIG. 2, the hopper means 34 for storing the sections 30 are arranged in longitudinal alignment with both the first and second webs. In the embodiment of FIGS. 10 and 11 the storage hopper means 34' is laterally displaced from the longitudinal axes of the first and second webs. Consequently, means are provided for laterally displacing the severed webs to the hopper means 34' to effect rotation of the sections about their vertical central axes through angles of 90°, and for returning the rotated sections to a position longitudinally arranged relative to the first web 20. Thus, lateral pusher means 140 are operable to laterally displace the severed sections 30 on the intermediate bridge 24 toward feed roller means 142 which deposit the successive sections in the upper end of the stationary upper section 34a'. Upon operation of the retaining means 36', the sections are deposited in the rotatable hopper portion 34b', whereupon the hopper section is rotated by the rotating means 42 to cause the flutes of the sections to extend parallel with the longitudinal axis of the first web. The sections are then deposited in the stationary lower hopper section 34c' by operation of the retaining means 44', whereupon successive sections 30 are deposited upon the endless vacuum-type conveyor means 144 that laterally transmits the sections back toward the feed rollers 146. In this embodiment, the nozzles 170 and 172 are arranged to supply adhesive to the lower surface of the projecting planar layer 30a and the upper surface of the projecting corrugated layer 30b as the severed section is being returned toward a position in alignment with the longitudinal axis of the first web 20. Consequently the severed sections 30 are returned to a position engagement with the adjustable stop means 150, whereupon the sections are longitudinally displaced by pusher means (similar to the pusher means 54 of FIG. 2) toward the pressing rollers 62 and 64 of the splicing means 60.

Figure 13:
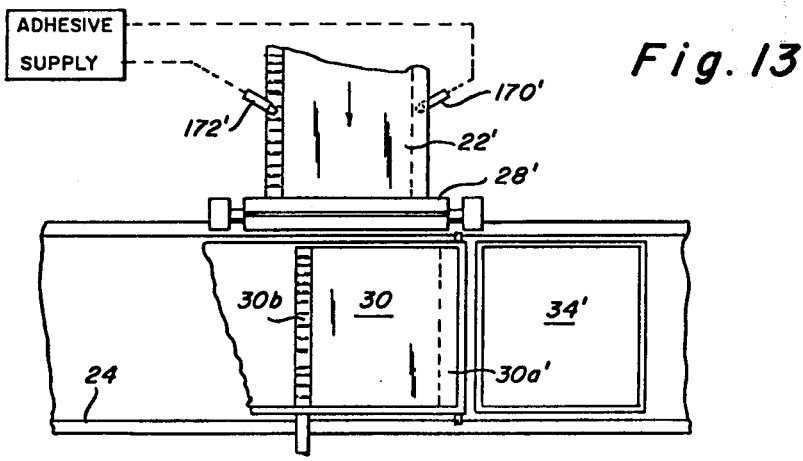
FIG. 13 is a top plan view of a modification of the apparatus of FIG. 1, wherein the second web is supplied normal to the vertical plane containing the axis of the first web.

Referring now to the embodiment of FIG. 13, the second web 22 is arranged normal to the vertical plane containing the longitudinal axis of the first web 20. Consequently, the web is severed by the transversely arranged cut-off means 28' into severed sections 30 which are deposited on the intermediate bridge 24, which sections are then directly deposited into the stationary hopper means 34'. Since the flutes of the second web 22 extend parallel with the longitudinal axis of the first web, the flutes of the severed sections 30' will similarly already extend parallel with the longitudinal axis of the first web, and consequently it is not necessary to effect further rotation of the severed sections. Consequently, the severed sections are successively removed from the bottom of the hopper 34' and are fed directly to the splicing means 60.

In each of the foregoing embodiments of the invention, the hopper means may be adjustable to accommodate severed sections of varying sizes. To be certain, the adjacent walls of the hopper sections may be connected by adjustable slot and bolt means 180 as shown in FIG. 14, whereby the horizontal cross sectional dimensions of the hopper may be adjusted as desired.

As indicated above, in each of the embodiments the advantage is afforded that the splicing of the severed sections may be achieved with a relative low degree of tolerance while still providing a very accurate strong splice between the adjacent ends of the sections. Thus, a tolerance of at least one inch may be achieved when the sections are severed from second webs having a width of about eight feet or so.

The specific adhesive means used for securing the severed sections together to form the first web is not particularly critical. Preferably, the adhesive means is of the self-adhering pressure sensitive type (i.e., an adhesive that will primarily adhere only to itself).

While in accordance with the provisions of the Patent Statutes the preferred forms and embodiments of the invention have been illustrated and described, it will be apparent to those skilled in the art that various changes and modifications may be made without deviating from the inventive concepts set forth above.

What is claimed is:

1. A continuous horizontal web of corrugated paperboard of indefinite length formed from a plurality of successive sections each including an upper first planar facer layer, and a lower first corrugated layer bonded in superimposed generally coextensive relation to said planar layer, the layers of each section having generally the same outer cross-sectional dimensions and being longitudinally offset to cause the facer layer to protrude at one end beyond the corrugated layer, and the corrugated layer to protrude at the other end beyond the facer layer, the flutes of the corrugated layer extending longitudinally beween the protruding ends of each section, the protruding portion of the facing layer of each section being bonded in overlapping relation to the protruding portion of the corrugated layer of the adjacent preceding section and to the adjacent portion of the facing layer of said preceding section, the protruding portion of the corrugated layer of each section being bonded in underlying flute-enmeshing relation with the corrugated layer of the adjacent trailing section, thereby to define a continuous web the flutes of which extend longitudinally.

2. A web as defined in claim 1, and further including second horizontal planar and corrugated layers bonded in superimposed relation to said first layers to define a web of indefinite length, the flutes of said second corrugated layer extending transversely of the web, said second corrugated layer being bonded to said first planar layer.

3. A web as defined in claim 2, and further including third horizontal and corrugated layers bonded to said web on the opposite side of said first layers from said second layers, the flutes of said third corrugated layer also extending transversely of the web, said third planar layer being bonded to said first corrugated layer.

4. A web as defined in claim 3, and further including a planar facer layer bonded to the exposed tips of the flutes of said third corrugated layer.

* * * * *